United States Patent Office 3,345,255
Patented Oct. 3, 1967

3,345,255
CONTROLLING FUNGI WITH 1,2-DICHLORO-VINYL HYDROXYETHYL SULFIDE
Glenn R. Price, Chicago Heights, Ill., and Malcolm B. McClellan, San Jose, Calif., assignors to Stauffer Chemical Company, New York, N.Y., a corporation of Delaware
No Drawing. Filed July 13, 1964, Ser. No. 382,379
1 Claim. (Cl. 167—22)

This invention relates to a new dichlorovinyl sulfide, its method of preparation and use as a fungicide. More specifically, the new compound is 1,2-dichlorovinyl hydroxyethyl sulfide ($HOCH_2CH_2SClC=CHCl$).

This new fungicide, which has been found to be especially active against *Aspergillus niger* and *Penicillium* sp. is prepared according to the following reaction:

$HOCH_2CH_2SH + ClC≡CCl \rightarrow HOCH_2CH_2SClC=CHCl$

The reaction is preferably carried out in the presence of an inert solvent such as benzene, ethanol, ethyl ether, and the like, but no solvent is required. Reaction temperatures need not be critically controlled, but are normally maintained between —20° C. and 100° C.

EXAMPLE

To a solution of 17.2 grams (0.2 mole) of ethyl mercapto ethanol in 100 ml. of ethanol contained in a reactor flask fitted with a stirrer and thermometer, was added a solution of 16.7 grams (0.175 mole) of dichloroacetylene in 50 ml. of ethyl ether. The addition was carried out over a period of 30 minutes at room temperature while stirring. The reaction mixture was then stirred for several more minutes, filtered and distilled to yield 21.7 grams (72% yield) of 1,2-dichlorovinyl hydroxyethyl sulfide having an index of refraction $N_D^{25}=1.5517$; and analysis of 17.8% S and 40.5% Cl was found as compared to 18.4% S and 40.9% Cl, theoretical.

In order to evaluate the novel fungicide of the invention, in vitro and soil fungicide incorporation tests were run. In the in vitro screening test, the sample compound was placed in a vial of melt broth and in a vial of nutrient broth at the rate of 50 p.p.m. Water suspensions of spores of *Aspergillus niger* and *Penicillium* sp., were added (one organism per vial). One week later, results were read and no growth was observed; an In Vitro evaluation test was then run. In the In Vitro evaluation test the same method employed in the In Vitro screening test was used except that the solution was diluted down to 5 p.p.m.

In the Soil Fungicide Incorporation test, the sample compound was pipetted into soil infested with *Fusarium solani* at a rate of 110 p.p.m. The treated soil was then mixed and dumped into a paper container. Beans were planted in the *Fusarium solani*-infested and treated soil, and three to four weeks later the plants were inspected for disease symptoms.

Results of the foregoing tests are set forth in the following table.

Table
[Fungicidal activity]

| Test and species: | Control[1] |
|---|---|
| In vitro evaluation: | |
|   *Aspergillus niger* | 100%/5 p.p.m. |
|   *Penicillium* sp. | 100%/5 p.p.m. |
| Soil Incorporation test: | |
|   *Fusarium solani* | [2] 100%/110 p.p.m. |

[1] Percent control of fungi growth (in vitro) or activity (soil incorporation test).
[2] Per concentration of active compound in test solution screening level.

We claim:
A method of controlling fungi which comprises contacting the fungi with a fungicidal amount of 1,2-dichlorovinyl-hydroxyethyl sulfide.

References Cited

UNITED STATES PATENTS

| | | | |
|---|---|---|---|
| 3,038,014 | 6/1962 | Geering | 260—608 |
| 3,062,892 | 11/1962 | Schneider | 260—609 |
| 3,109,032 | 10/1963 | Aichenegg | 260—608 |
| 3,174,897 | 3/1965 | Aichenegg | 167—22 |
| 3,228,988 | 1/1966 | Aichenegg | 260—608 |

FOREIGN PATENTS

| | | |
|---|---|---|
| 1,032,967 | 6/1958 | Germany. |
| 1,162,355 | 2/1964 | Germany. |

LEWIS GOTTS, *Primary Examiner.*
S. K. ROSE, *Assistant Examiner.*